June 4, 1935.  W. J. PODBIELNIAK  2,003,308

CENTRIFUGAL FRACTIONATING METHOD AND APPARATUS

Original Filed Aug. 10, 1932   6 Sheets-Sheet 1

Inventor:
Walter J. Podbielniak
By Benjamin Schneider
Attorney

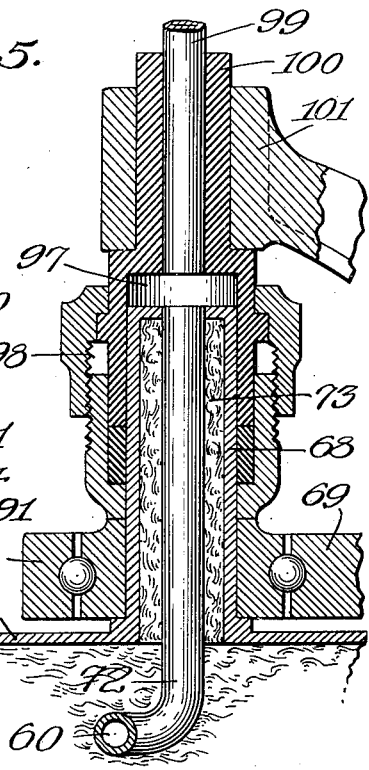
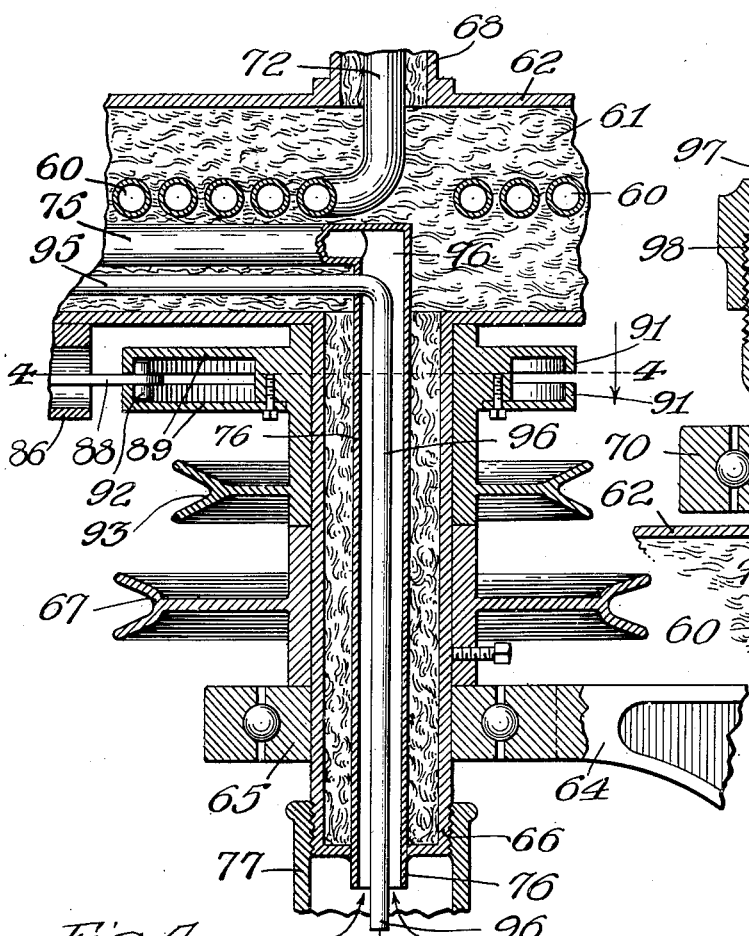
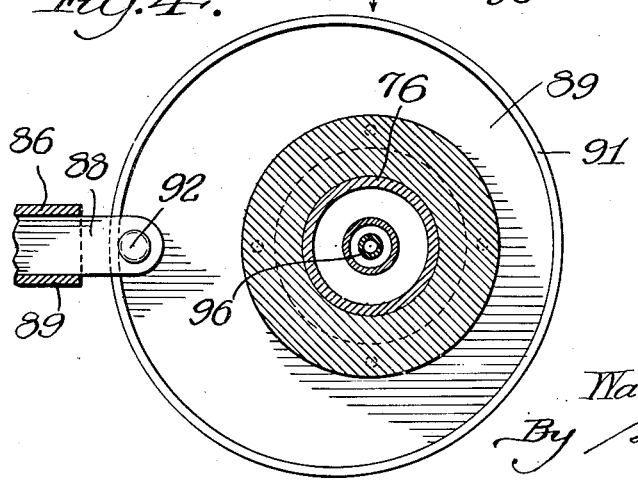

June 4, 1935. W. J. PODBIELNIAK 2,003,308
CENTRIFUGAL FRACTIONATING METHOD AND APPARATUS
Original Filed Aug. 10, 1932   6 Sheets-Sheet 3
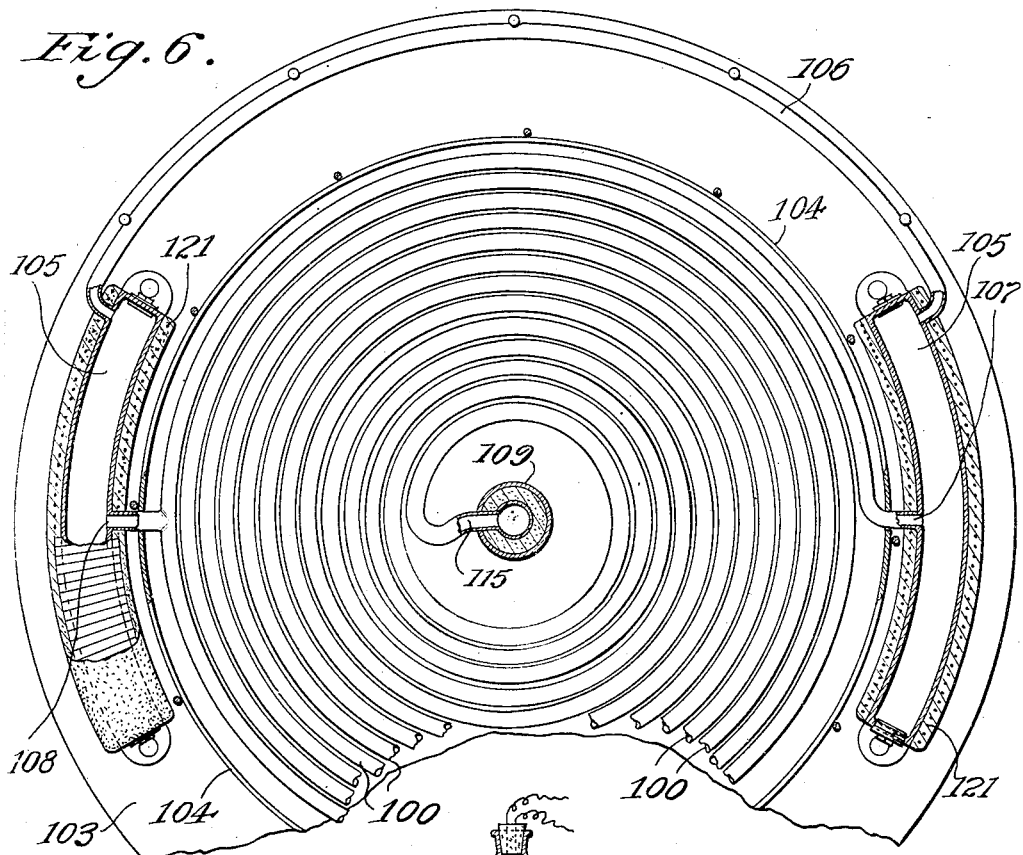
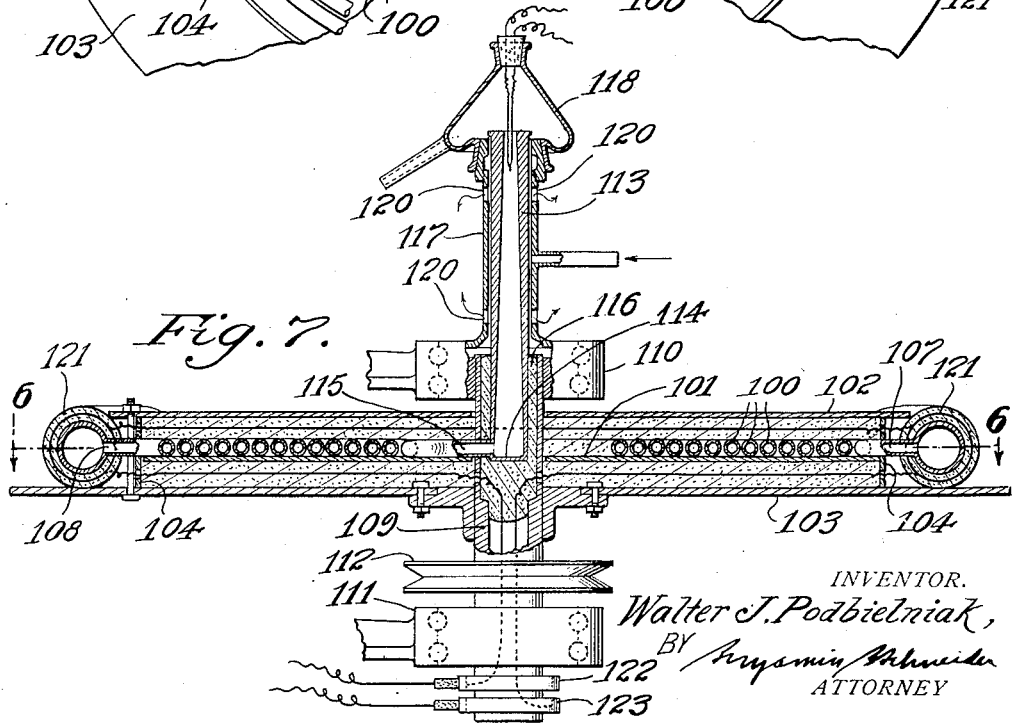
INVENTOR.
Walter J. Podbielniak,
BY
ATTORNEY

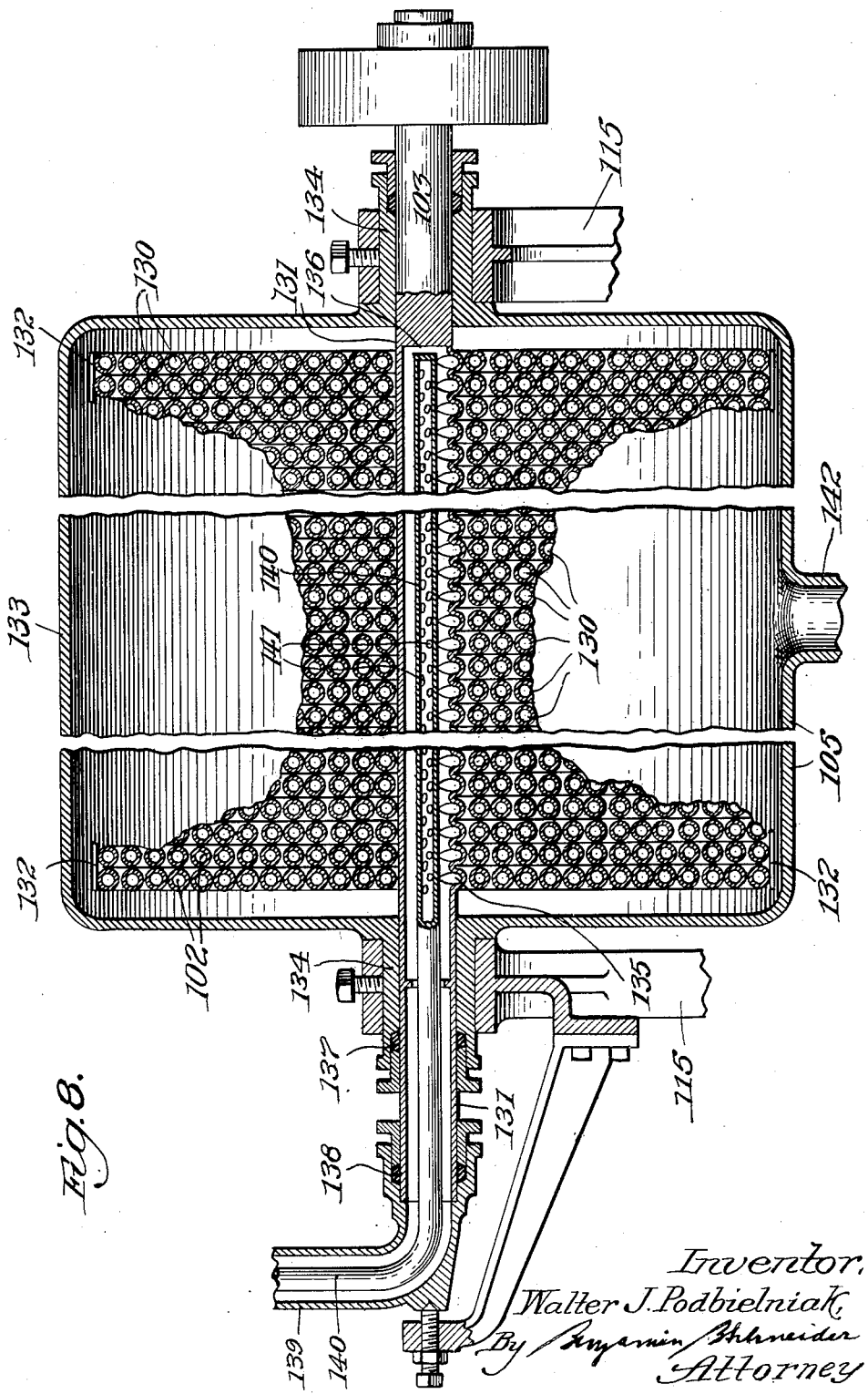

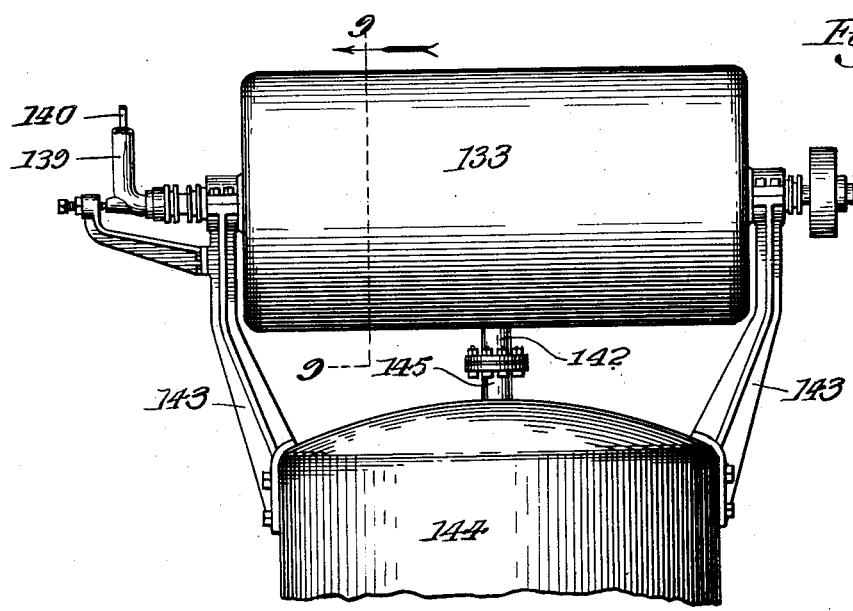
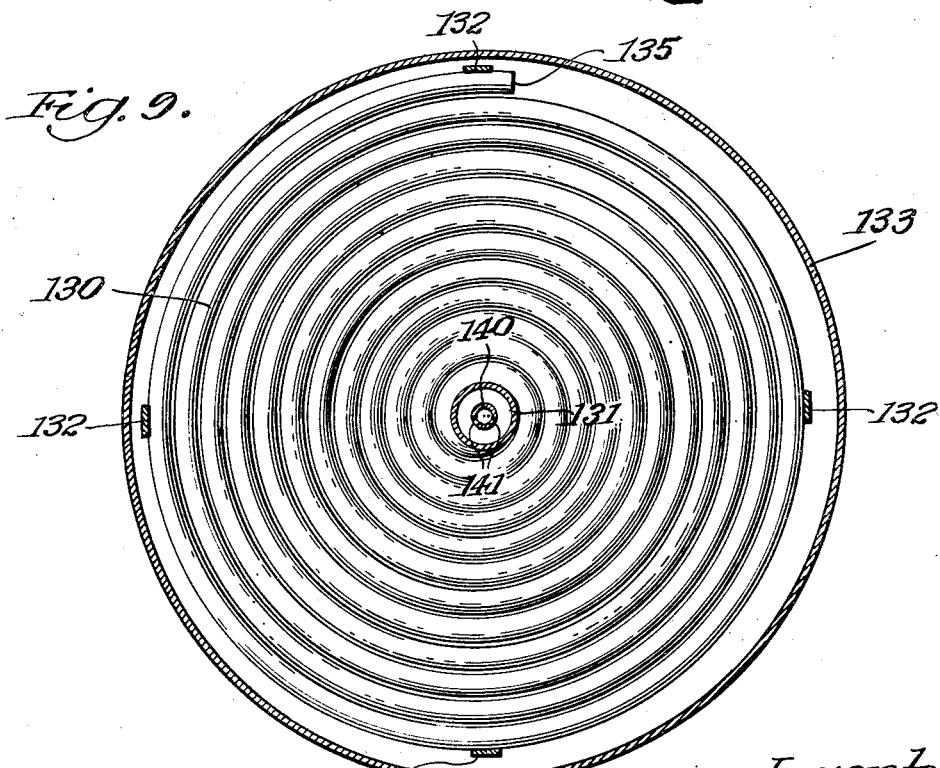

June 4, 1935.  W. J. PODBIELNIAK  2,003,308
CENTRIFUGAL FRACTIONATING METHOD AND APPARATUS
Original Filed Aug. 10, 1932   6 Sheets-Sheet 6

Inventor:
Walter J. Podbielniak,
By Benjamin Holmes
Attorney.

Patented June 4, 1935

2,003,308

UNITED STATES PATENT OFFICE 2,003,308

CENTRIFUGAL FRACTIONATING METHOD AND APPARATUS

Walter J. Podbielniak, Chicago, Ill.

Application August 10, 1932, Serial No. 628,152.
Renewed August 23, 1934. In Canada August 12, 1931

23 Claims. (Cl. 202—198)

This invention deals with the art of fractional distillation of volatile fluids, and provides a novel method and apparatus for fractional distillation, either on a commercial scale or for analytical processes, of fluids having constituents of different boiling points, for contacting liquids and gases and for contacting liquids of different densities for absorption or reaction or heat exchange purposes.

In my prior application Serial No. 476,190, filed August 18, 1930, I have described a method and apparatus for the countercurrent treatment of fluids of different densities, for reaction or heat exchange purposes, commercial and precise analytical distillation and the like wherein a more effective countercurrent treatment and more accurate fractionation or distillation may be effected. In employing the method and apparatus therein set forth, countercurrent flow is brought about by means of centrifugal force, the reflux or heavier liquid being thereby caused to flow rapidly through a tube or column of small diameter, the amount of liquid and vapor retained in the column held to a minimum. At the same time, the column or tube may be built of practically any desired length without involving prohibitive construction and without encountering the limitations in length, cross-sectional area and through-put involved when gravity is depended upon to secure the desired countercurrent flow. A much greater efficiency in fractionation, or more effective absorption, chemical or contact action may accordingly be secured than in apparatus of the type hitherto known.

The present invention relates to improvements in the method and apparatus of my prior application hereinbefore referred to, and will be fully understood from the following specification, illustrated by the accompanying drawings, wherein:

Fig. 3 is a detail sectional view, showing the lower mounting of the device of Fig. 1;

Fig. 4 is a detail sectional view on the line 4 of Fig 3;

Fig. 5 is a detail sectional view showing the upper mounting of the device of Fig. 1;

Fig. 6 is a view of a modified form of construction in horizontal section on line 6—6 of Fig. 7;

Fig. 7 is a vertical sectional view of the form of construction illustrated in Fig. 6;

Fig. 8 is a view of a modified form of countercurrent contact device in multiple disk form;

Fig. 9 is a vertical sectional view on line 9 of Fig. 8;

Fig. 10 is a view on a reduced scale showing the device of Fig. 8 in connection with a still or other vaporizing device;

Figure 1:
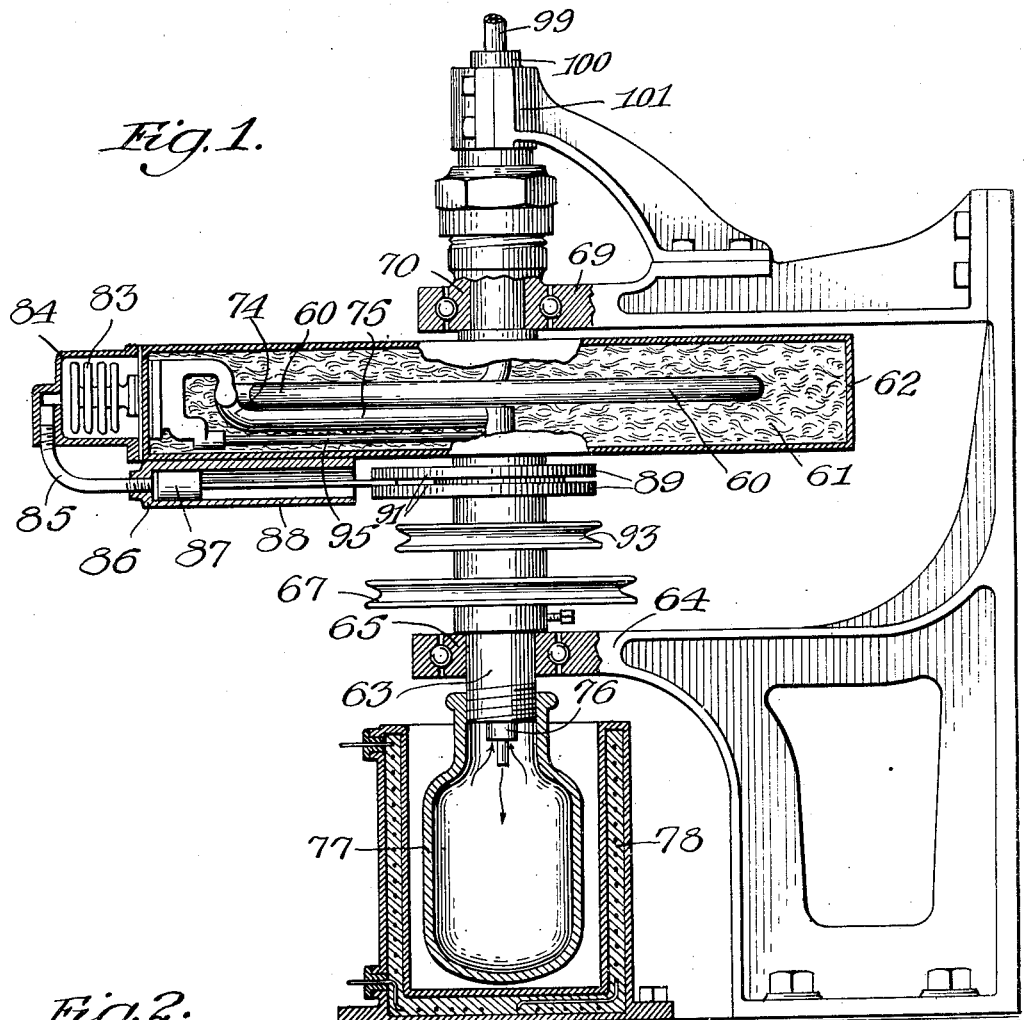
Figure 1 is a vertical sectional view of a form of apparatus for fractional distillation embodying the invention, in which the coil is formed as a flat spiral instead of a spiral helix.
Figure 2:
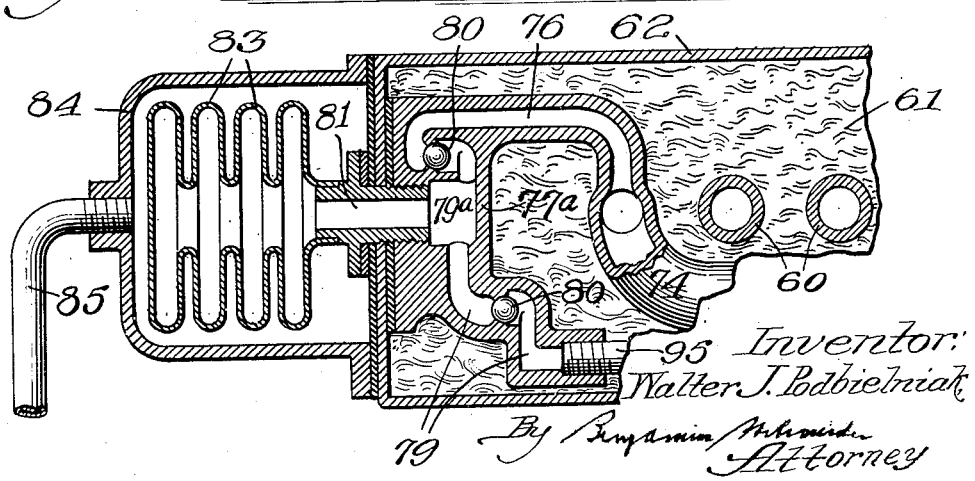
Fig. 2 is an enlarged sectional view of a detail of the pump mechanism of Fig. 1.

In the form of construction shown in Figs. 1 to 4, a form of apparatus is illustrated, which is particularly adapted to distillation operations.

In this form of construction, the tube, formed as a flat spiral 60, is surrounded by insulating material 61 and encased in a generally disk-like casing 62, mounted for rotation about a vertical axis. On its lower side, the casing 62 is provided centrally with a vertical, depending cylindrical tubular bearing member 63 which passes through the horizontal journal 64 supported on a frame. The cylindrical tube 63 is mounted in the journal 64 in a suitable bearing 65, and acts as a tubular drive shaft. Its lower end is closed and is provided with exterior threads as indicated at 66 in Fig. 3. A drive pulley 67 is secured to the cylindrical shaft member 63, as by a set screw.

On its upper side the casing 62 is likewise provided centrally with a cylindrical tube member 68 serving as a shaft member and projecting upwardly through the journal 69, being mounted in a bearing 70 therein.

The inner end of the coil spiral 60 is directed upwardly from the center of the coil at 71 and from that point the tube portion 72 projects upwardly through the tubular shaft member 68, being surrounded within the latter by a packing of a suitable insulating material, such as asbestos, designated 73. This central tube constitutes the outlet for the lighter fluid or uncondensed vapor passing out of the coil.

At its outer end, the tube forming the coil or spiral is curved downwardly, as at 74, and from this point is carried as the tube 75 radially within the casing 62 and opens into the central tube 76 which passes downwardly through the cylindrical shaft member 68, being surrounded within the latter by the insulating packing 76, which may be of asbestos or other suitable material. The tube 76 constitutes the inlet to the spiral for lighter fluid or vapor.

In Figs. 1 to 5 inclusive, the device is illustrated as used in fractional condensation of the vapors from a still or heating device. The still may suitably be a vessel of cylindrical shape, designated 77, the mouth of which is internally threaded so that it can be screwed to the shaft member 63, the tube 76 then communicating with the interior of the vessel and receiving vapors therefrom. The vessel 77 and its contents are heated by any suitable means, for example, by the surrounding electrical resistance heating furnace 78. In operation, the casing 62 with the coil spiral 60 and the associated parts, including the cylindrical tubular shaft members 63 and 68 and the heated vessel 77 are rotated at a suitable speed to bring the desired centrifugal force into play, say from 1000 to 4000 R. P. M. Vapors from the vessel 77 rise through the radial tube portion 75 to the outermost turn of the coil, through which they pass countercurrent to the reflux liquid, provided as hereinafter described. Uncondensed vapors pass out from the inner coil of the spiral 60 through the tube 72.

To provide for the return of reflux condensate from the tube to the distilling vessel 77, at the end of the outer turn of the coil 60, where it turns downwardly at 74 and is connected with the radial tube 75, a liquid outlet tube 76 is provided, which extends radially outward to the valve casing 77ª of a pump device, suitably of the diaphragm type. The valve casing, which is connected to the outer wall of the casing 62, is provided centrally with a chamber 79ª with which the liquid inlet line 76 communicates. It discharges through the line 79, as hereinafter set forth. In the inlet and outlet valves, ball check valves 80 are provided and are so arranged as to be seated by centrifugal force during operation of the device. From the chamber 79ª in the pump casing there is provided a short conduit 81 extending radially through the periphery of the casing 62 and terminating in the interior of a suitable diaphragm, for example, the metallic bellows member 83. The latter is completely encased in a chamber 84, which communicates through the pipe 85 with the interior of the pump cylinder 86, within which there is provided the reciprocable piston 87. The latter is operated through piston rod 88 by means of the eccentric 89, suitably formed of two spaced disks 89ª formed on or secured to the sleeve 90 journaled on the tubular shaft member 63, the disks 89ª being formed with flanges 91 directed toward each other and spaced at their lips to provide a peripheral opening through which the piston rod 88 passes. On the inner side of the flanges, rollers 92 are secured to the piston rod 88, these rollers riding on the inner faces of the flanges 91. The sleeve 90 together with the eccentric disks 89ª are rotated with respect to the tubular drive shaft 63 of the disk 62 by means of the pulley 93, driven by any suitable drive member. In operation, the sleeve 90 and the eccentric disks 89 are driven at a rate of speed different from that at which the casing 62 and the tube spiral contained therein are driven, the difference determining the number of reciprocations given the pump piston 87. Thus, if the tube spiral is driven at a rate of 1800 R. P. M. and the pulley 93 and eccentric disks 89 are driven at a rate of 1650 R. P. M., the pump piston 87 will be reciprocated 150 times per minute. The reciprocation of the piston 87 is communicated to the liquid filling the diaphragm chamber 84 and the conduit 85 and causes a corresponding contraction and expansion of the diaphragm bellows 83, thereby communicating movement to the liquid reflux contained in the pump chamber 78. By the action of the ball valves 80, the reflux, forced out of the tube spiral through the line 76 into the pump chamber, is forced out through the conduit 79 and passes through the radial tube 95, which enters the central vapor conduit 76 and passes actually downward therethrough, as shown at 96, the reflux return tube terminating somewhat below the opening of the vapor tube 76. The reflux or heavier liquid discharged from the tube spiral by centrifugal force is thus returned to the heating vessel 77.

The vapors discharged from the inner end of the tube spiral through the line 72 enter a chamber 97 in a stuffing box 98, from which they pass out through the stationary tube 99 mounted in a sleeve 100 in a bracket 101 supported from the frame 65.

In the operation of the device the tube spiral, with its casing 62, is rotated at a predetermined speed, the distilling vessel 77 being rotated therewith. The contents of the distilling vessel 77, in normal operation, are disposed against the sides of the vessel, and not at the bottom as in ordinary operation of stationary stills. The contents of the distilling vessel are heated and the vapors given off passed through the line 76 and the line 75, entering the tube spiral 60 at its outer end. They traverse the tube spiral countercurrent to reflux liquid or absorption liquid, which may be supplied through the pipes 99 and 72. The reflux liquid is forced to travel outwardly through the spiral against the vapors by centrifugal force, effective fractionation or absorption of constituents of the vapors being secured in the spiral. On reaching the outer end of the spiral, liquid is forced to enter the conduit 76, from which it is withdrawn into the pump chamber 79ª and forced through the reflux or liquid return line 95 back through the line 96 into the distilling vessel.

In Figs. 6 and 7 I have shown a modified form of apparatus in which the tube or column is likewise formed as a flat spiral, and in which the vessel or vessels containing the liquid subjected to distillation are directly connected with the spiral column.

In this form of construction the flat spiral tube 100 is, for convenience, mounted on a plate or disk 101 of wood, bakelite or other suitable material, and the spiral tube and mounting plate are packed in heat insulating material, such as asbestos, in a casing formed by upper plate 102, lower plate 103 and the cylindrical ring 104. The lower plate 103 is extended beyond the ring 104 and on it are mounted the opposed balanced vessel or kettles 105, of generally toroidal shape, which communicate by the liquid level balancing tube 106. The balanced vessels communicate with the outer turn of the spiral tube 100 at 107 and 108 respectively. It will be noted that the liquid level balancing tube 106 opens into the vessels 105 at their outer peripheries and the communicating tubes 107 and 108 at their inner sides, as in rotation, liquid present in the kettles is thrown to the outer side by centrifugal force.

The assemblage of the kettles, tube spiral and associated parts is mounted on the hollow, rotatable shaft 109 supported by bearings 110 and 111 and driven by pulley 112 from any suitable source of power. Within the hollow shaft 109 is mounted the delivery tube 113 which projects beyond the upper end of shaft 109 and rotates therewith. The interior tubular cavity 114 in delivery tube 113 is conical in form, enlarging slightly from its upper end, which is open, to its lower end 114ª which is closed. The inner end of tube spiral 100 is bent inwardly at 115 and opens into delivery tube 113 at about its lower end. The interior of shaft 109, surrounding the delivery tube 113 is packed with suitable heat insulating material 116, such as asbestos, slag wool, or the like.

The portion of the delivery tube 113 extending beyond shaft 109 is surrounded by a stationary mantle or sleeve 117 mounted on the casing of bearing 110. At the top of sleeve 117 there is provided a collecting still head 118, into which delivery tube 113 opens. The sleeve 117 is spaced from the delivery tube 113 and air or other suitable cooling medium may be forced into the space between the two by means of inlet pipe 119, discharging through openings 120. If desired, a cooling or reflux liquid may be supplied in the delivery conduit, to aid in cooling the vapors and supplement the reflux condensate formed therein and in the spiral.

In operation, the shaft 109 carrying the tube spiral and associated parts is rotated at a suitable speed, say 1000 to 2500 R. P. M. The vessels 105, previously charged with the desired quantity of a mixed liquid to be fractionated, are heated, as by resistance coils 121 connected in series and to the slip rings 122 and 123. The vapors pass inwardly through the tube spiral 100 countercurrent to reflux, which is forced outwardly by centrifugal force. Reflux condensate formed in the delivery tube 113 is forced to travel in the direction of enlarging diameter and hence finds its way into the inner end 115 of the tube spiral 100.

The form of apparatus illustrated in the preceding figures and particularly Figs. 6 and 7 is particularly suited for precise analytical distillation of mixture of liquids having slight differences between their boiling points, such as mixture of hydrocarbons, alcohols and the like. In an apparatus of the form shown in Figs. 6 and 7 constructed for the purpose, the vessels 105 were each of 125 cc. capacity. The tube spiral 100 had a length of 1240 cm. and the tube an internal diameter of about 4.75 mm. With speeds of rotation of as low as 1000 to 1750 R. P. M., with such an apparatus, I am able to secure, in a single distillation a sharp and clean separation of constituents boiling 2 to 3° apart and with a rate of distillation 3 to 10 times faster than with the most precise fractionating column of the vertical tubular type now available. The apparatus is also of great value in detecting the presence of unexpected impurities, isomers, and the like in liquid, such as alcohol and hydrocarbon mixtures, petroleum distillates and the like. It is readily apparent that the balanced vessels 105 may be replaced by a single complete annular vessel or by other suitable balanced containers for the liquid to be distilled.

In Figs. 8 and 9 I have shown a modified form of apparatus, more particularly adapted for commercial installations. In this form of construction, the individual tube spirals 130, each in disk form, are mounted on a hollow shaft 131, being suitably held in a position, as by a frame 132. The shaft 131 passes through trunnions 134 of a stationary cylindrical casing 133. At their inner ends the tube spirals open, as indicated at 106, into the interior of the shaft 131. The outer ends of the tube spirals open directly into the interior of the casing 133 as indicated at 135.

The hollow shaft 131 is closed at one end, 136, and at its other end passes through a stuffing box 137 in the casing trunnion 134 and enters a stuffing box 138 provided at the end of the stationary outlet pipe 139. A smaller relatively stationary liquid supply pipe 140 passes through the vapor outlet pipe 139 and the hollow shaft 131, being closed at its end and provided with perforations 141 for that portion of its length opposite the openings of the tube spirals 130.

The operation of the device of Figs. 8 and 9 will be readily apparent. Vapors or light liquid entering the casing, for example, through the inlet pipe 142 under suitable pressure are forced into the spiral tubes 130 and traverse them countercurrent to heavier fluid or liquid. Liquid may be supplied at the interior of the tube spirals through the pipe 140.

The device of Figs. 8 and 9 is illustrated in Fig. 10 in its application to a distillation process, the casing 133 being mounted by means of brackets 143 on the still 144, and the inlet 142 of the casing 133 being secured to the vapor outlet 145 from the still. Vapors from the still enter the casing 133, and are forced to traverse the tube spirals 130 as hereinbefore described, the spirals being rotated at a suitable speed to secure the desired centrifugal force effect, say 1000 to 4000 R. P. M. Reflux liquid is supplied through the tube 140, enters the tube spirals, and passes through them countercurrent to the vapors, effective fractionation being secured in the tube spirals. Reflux and condensate is thrown out of the tube spirals into the chamber within the casing 133, and descends through the pipe 142 into the still 144.

It will be readily apparent that the apparatus may be shown substantially as illustrated in the preceding figures for the absorption of constituents of gases or vapors by absorptive or reactive liquids, the absorption or reaction liquid being supplied through the line 140 and the vapors to be treated being supplied through the inlet line 142.

Figure 11:
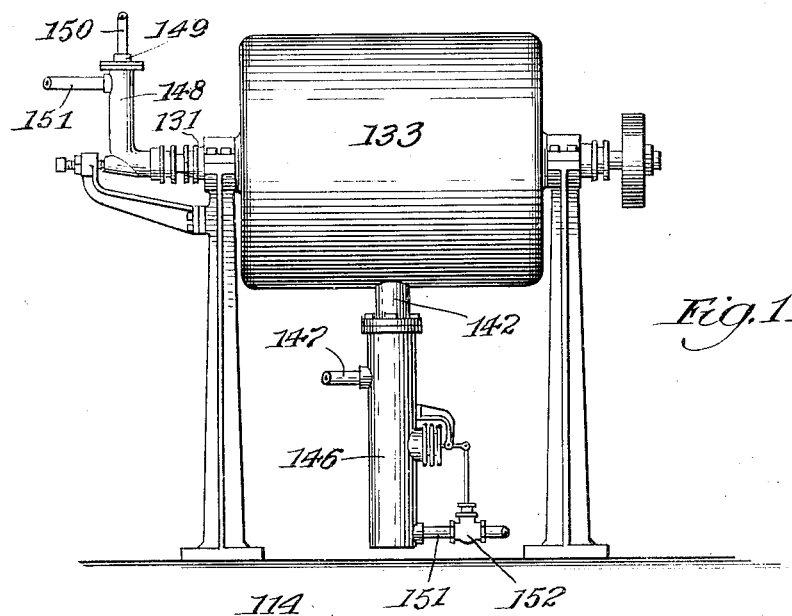
Fig. 11 is a view on reduced scale, showing the device of Fig. 8, adapted for the treatment of immiscible liquids in a countercurrent contact operation.
Figure 12:
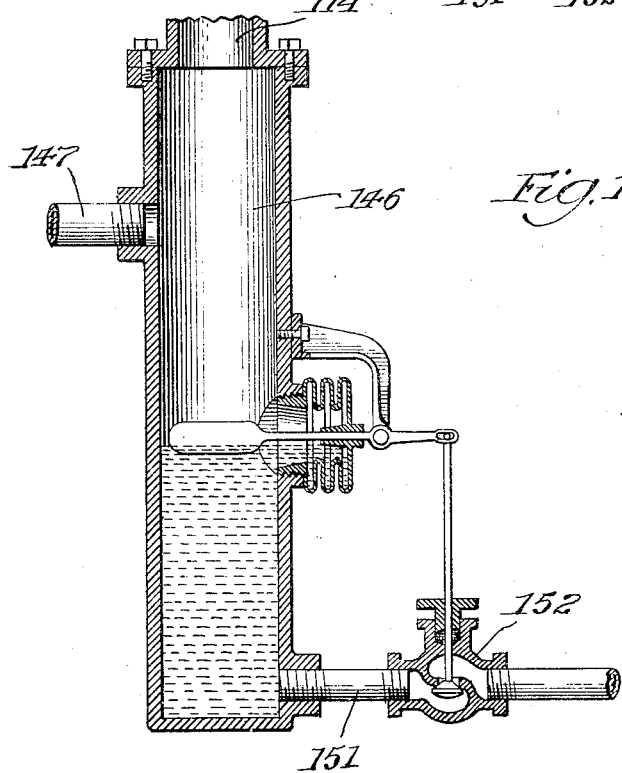
Fig. 12 is a detail sectional view of the separating chamber of the device shown in Fig. 11.

In Figs. 11 and 12, a modification of Figs. 8 and 9 is shown in connection with apparatus for the treatment of a lighter by a heavier liquid, for example, as in the treatment of oils with sulfuric acid to remove constituents of the former. In this method of utilization, the casing 133 communicates through its inlet 142 with an elongated chamber 146, to which the lighter liquid to be treated is supplied through the line 147. The light liquid is forced under pressure up into the casing 133 and into the tube spirals which it traverses, leaving through the central hollow shaft 131 and the outlet pipe 148, the latter terminating in a cap 149 through which the line 150 enters. The treated light liquid is withdrawn through the line 151. The heavy liquid used in the process is supplied through the line 150, enters the tube spirals, and passes through them countercurrent to the light liquid, by the action of the centrifugal force developed on rotation of the tube spirals. The desired chemical action between the heavy and light liquids takes place, and the used heavy liquid is discharged into the casing 133 settling through the opening 142 into the chamber 146. In the latter separation of the heavy and the light liquids takes place, the heavier liquid descending to the bottom and discharging through the line 151, provided with the float controlled valve 152.

It is apparent that the apparatus of the present invention is particularly adapted for contact or interchange between fluids, either between vapor and liquid or between lighter and heavier liquids, for fractionation, absorption, heat exchange or chemical reaction purposes.

Although the present invention has been described in connection with the details of specific examples thereof, it is not intended that these shall be regarded as limitations on the scope of the invention except in so far as included in the accompanying claims.

I claim:

1. In apparatus of the character described, a spirally coiled, laterally closed conduit, means for rotating the conduit around the axis of the spiral, each end of the conduit having a portion extending to the axis of the spiral, and means for supplying a fluid to the conduit extension for the outer end of the spiral, and means for withdrawing fluid from the conduit extension of the inner end of the spiral.

2. In apparatus of the character described, a spiral tube coil, a casing therefor, heat insulating material within said casing around said coil, a conduit disposed axially of said coil and communicating with the inner end thereof, means for rotating the coil and casing and means for supplying a fluid to the outer end of the coil under pressure sufficient to force it inwardly therethrough.

3. In apparatus of the character described, a spiral tube coil, a casing therefor, heat insulating material within said casing around said coil, a conduit disposed axially of said coil and communicating with the inner end thereof, means for rotating the coil and casing, a heated distilling vessel and means for supplying vapors therefrom to the outer end of the coil.

4. In apparatus of the character described, a spiral tube coil, a casing therefor, heat insulating material within said casing around said coil, a conduit disposed axially of said coil and communicating with the inner end thereof, means for rotating the coil and casing, a heated distilling vessel, means for supplying vapors therefrom to the outer end of the coil to pass therethrough with formation of reflux condensate and means for conducting reflux condensate from the outer end of the coil to said distilling vessel.

5. In apparatus of the character described, a laterally closed conduit formed as a spiral coil, means for rotating the conduit about the axis of the spiral, means for supplying fluid within the conduit, whereby its rotation causes the fluid to move outwardly through the spiral, means for collecting fluid discharged from the outer end of the spiral, and means for forcing the collected fluid inwardly toward the axis of the spiral for removal therefrom.

6. In apparatus of the character described, a conduit formed as a spiral coil, means for rotating the conduit around the axis of the spiral, means for providing liquid within the conduit, whereby said liquid is forced to travel outwardly through the spiral coil by rotation of the latter, means for collecting and discharging liquid from the outer end of the spiral coil, said collecting and discharging means comprising a liquid collecting chamber rotatable with the spiral coil, means for causing intermittent pulsations of the liquid in said chamber to force it therefrom, and a discharge conduit from said chamber extending in the direction of the axis of the coil.

7. In apparatus of the character described, a conduit formed as a spiral coil, means for rotating the conduit around the axis of the spiral, means for providing liquid within the conduit, whereby said liquid is forced to travel outwardly through the spiral coil by rotation of the latter, means for collecting and discharging liquid from the outer end of the spiral coil, said collecting and discharging means comprising a liquid collecting chamber rotatable with the spiral coil, means for causing pulsating movements of the liquid in said chamber to force liquid therefrom, said pulsating means including a pump cylinder extending perpendicularly to the axis of the coil, a piston movable in said cylinder, an actuating rod for said piston, and means independently rotatable on the axis of said coil for operating said actuating rod.

8. In an apparatus of the class described, a conduit formed as a flat spiral coil, means for rotating the coil around its axis, a vapor inlet pipe extending from the outer end of the coil radially to the axis of the coil, an axially directed tube communicating therewith, an axial pipe communicating at the inner end of the conduit, means for supplying vapors through the axially directed tube and radially extending vapor inlet pipe to the outer end of the conduit and causing them to pass therethrough, means for cooling the vapors in passage to the conduit, thereby condensing constituents thereof, and means for rotating the conduit upon the axis of the spiral, thereby causing condensate formed in the conduit to travel outwardly through the coil countercurrent to the vapors.

9. In apparatus of the class described, a spirally coiled tube, a delivery conduit extending axially of the spiral of said tube and connected to the innermost turn thereof, said delivery conduit being formed with an inward taper extending from its point of connection with said spiral tube to its outlet, and means for rotating the tube spiral and conduit whereby liquid in said delivery conduit is forced to enter the tube spiral.

10. In apparatus of the class described, a spirally coiled tube, a delivery conduit extending axially of the spiral of said tube and connected to the innermost turn thereof, said delivery conduit being formed with an inward taper extending from its point of connection with said spiral tube to its outlet, means for cooling said delivery conduit, and means for rotating the tube spiral and conduit whereby liquid in said delivery conduit is forced to enter the tube spiral.

11. In apparatus of the class described, a spirally coiled tube, a delivery conduit extending axially of the spiral of said tube and connected to the innermost turn thereof, said delivery conduit being formed with an inward taper extending from its point of connection with said spiral tube to its outlet, means for supplying heated vapors to the outer turn of said tube spiral, means for cooling said delivery conduit, thereby forming reflux condensate therein, and means for rotating the tube spiral and conduit whereby the reflux condensate is forced to enter and traverse the tube spiral.

12. In apparatus of the character described, a spiral tube coil, means rotatably supporting said coil, a vessel on said supporting means communicating with the outer turn of said coil, means for heating said vessel to generate vapors therein to pass through said coil, and means for rotating the supporting means with said spiral tube coil and vessel.

13. In apparatus of the character described, a spiral tube coil, means rotatably supporting said coil, a vessel on said supporting means communicating with the outer turn of said coil, means for heating said vessel to generate vapors therein to pass through said coil, means for cooling the vapors passing through said coil and forming reflux condensate therein, and means for rotating the supporting means with said spiral tube coil and vessel.

14. In apparatus of the character described, a spiral tube coil, means rotatably supporting said coil, a vessel on said supporting means communicating with the outer turn of said coil, means for heating said vessel to generate vapors therein to pass through said coil, a delivery conduit disposed axially of said coil and connected to the innermost turn thereof, said conduit being formed with an inward taper extending from its point of connection with said spiral tube to its outlet, means for cooling the delivery conduit, thereby forming reflux condensate therein, and means for rotating the coil and delivery tube, whereby said reflux condensate is forced into and outwardly through said coil, to return to said distilling vessel.

15. In apparatus of the character described, a spiral tube coil, means rotatably supporting said coil, balanced vessels on opposite sides of said supporting means communicating with the outer turn of said coil, means for heating said vessels to generate vapors therein to pass through said coil, and means for rotating the supporting means with said spiral tube coil and vessel.

16. In apparatus of the character described, a spiral tube coil, means rotatably supporting said coil, balanced vessels of toroidal shape on opposite sides of said supporting means communicating with the outer turn of said coil, means for heating said vessels to generate vapors therein to pass through said coil, and means for rotating the supporting means with said spiral tube coil and vessel.

17. In apparatus of the character described, a spiral tube coil, means rotatably supporting said coil, balanced vessels on opposite sides of said supporting means communicating with the outer turn of said coil, a liquid balancing line connecting the outermost sides of said vessels, means for heating said vessels to generate vapors therein to pass through said coil, and means for rotating the supporting means with said spiral tube coil and vessel.

18. In apparatus of the class described, a casing, a tube extending into the casing and mounted rotatably therein, a flat conduit spiral within said casing mounted axially on said tube and rotatable therewith, said conduit spiral opening at its inner end into said tube and at its outer end within the casing, means for supplying a light liquid within the casing and forcing it inwardly through the conduit spiral, means for supplying a heavier liquid immiscible with the lighter liquid through the tube to the inner end of the spiral conduit, and means for rotating the tube and the conduit spiral mounted thereon whereby said heavier fluid is forced by centrifugal force to travel outwardly through the spiral conduit counter current to said lighter liquid.

19. In apparatus of the class described, a casing, a hollow tube extending into said casing and rotatable therein, a plurality of conduits, each formed as a flat spiral, mounted on said conduit, the latter extending axially of said conduit spirals, the inner end of each of said conduit spirals opening into said tube and the outer ends thereof opening into the casing, and means for rotating the tube and the conduit spirals mounted thereon.

20. In apparatus of the class described, a casing, a hollow tube extending into said casing and rotatable therein, a plurality of conduits, each formed as a flat spiral, mounted on said conduit, the latter extending axially of said conduit spirals, the inner end of each of said conduit spirals opening into said tube and the outer ends thereof opening into the casing, means for rotating the tube and the conduit spirals mounted thereon, means for supplying vapors into said casing, to enter said spirals and travel inwardly therethrough, and means for cooling the vapors in passage through the spirals whereby reflux condensate formed in said spirals is forced on rotation of the spirals to travel outwardly therethrough and is discharged within the casing.

21. In apparatus of the class described, a casing, a tube extending into the casing and mounted rotatably therein, a plurality of flat conduit spirals mounted axially on said tube and rotatable therewith, said conduit spirals opening at their inner ends within said tube and at their outer ends within the casing, means for supplying a light liquid within the casing and forcing it inwardly through the conduit spirals, means for supplying a heavier liquid immiscible with said light liquid through the tube to the inner ends of the spiral, and means for rotating the tube and the conduit spirals mounted thereon whereby said heavier fluid is forced by centrifugal force to travel outwardly through the spirals.

22. In apparatus of the class described, a casing, a tube extending into the casing and mounted rotatably therein, a plurality of flat conduit spirals mounted axially on said tube and rotatable therewith, said conduit spirals opening at their inner ends within said tube and at their outer ends within the casing, means for supplying a light liquid within the casing and forcing it inwardly through the conduit spirals, means for supplying a heavier liquid immiscible with said light liquid through the tube to the inner ends of the spiral, means for rotating the tube and the conduit spirals mounted thereon whereby said heavier liquid is forced by centrifugal force to travel outwardly through the spirals and is discharged into the casing, and means for separating the heavier liquid thus discharged into the casing from the lighter liquid.

23. In apparatus of the class described, a casing, a tube extending into the casing and mounted rotatably therein, a plurality of flat conduit spirals mounted axially on said tube and rotatable therewith, said conduit spirals opening at their inner ends within said tube and at their outer ends within the casing, means for supplying a light liquid within the casing and forcing it inwardly through the conduit spirals, means for supplying a heavier liquid immiscible with said light liquid through the tube to the inner ends of the spiral, a stationary pipe extending into said rotatable tube and opening thereinto, and means for supplying a heavier liquid to said stationary pipe, whereby it is discharged into the interior of said tube and enters the spirals, and means for rotating the tube and the conduit spirals mounted thereon, whereby said heavier liquid is forced to travel outwardly through said spirals.

WALTER J. PODBIELNIAK.